(12) United States Patent
Dziedzic et al.

(10) Patent No.: US 6,682,293 B2
(45) Date of Patent: Jan. 27, 2004

(54) SPARE TIRE CARRIER

(75) Inventors: Jerzy Dziedzic, Milford, MI (US); Nishkamraj U. Deshpande, Novi, MI (US); Mohammed Asif Movania, Farmington, MI (US)

(73) Assignee: Edscha North America, Pontiac, MI (US)

( * ) Notice: Subject to any disclaimer, the term of this patent is extended or adjusted under 35 U.S.C. 154(b) by 0 days.

(21) Appl. No.: 10/071,948

(22) Filed: Feb. 7, 2002

(65) Prior Publication Data

US 2003/0147731 A1 Aug. 7, 2003

(51) Int. Cl.$^7$ ............................................... B66D 1/00
(52) U.S. Cl. ........................................ 414/463; 254/323
(58) Field of Search ................................ 414/463, 466; 254/323

(56) References Cited

U.S. PATENT DOCUMENTS

| | | | | |
|---|---|---|---|---|
| 3,372,821 A | * | 3/1968 | Podhajsky | 414/463 |
| 3,856,167 A | | 12/1974 | Yasue et al. | 214/451 |
| 4,884,785 A | | 12/1989 | Denman et al. | 254/389 |
| 4,915,358 A | | 4/1990 | Stallings | 254/323 |
| 5,188,341 A | | 2/1993 | Greaves | 254/323 |
| 5,314,288 A | | 5/1994 | Schmidt | 414/463 |
| 6,079,932 A | | 6/2000 | Boucher | 414/463 |
| 6,142,449 A | | 11/2000 | Aldridge et al. | 254/323 |
| 6,267,546 B1 | | 7/2001 | Oxyer et al. | 414/463 |
| 6,293,522 B2 | | 9/2001 | Dobmeier et al. | 254/323 |
| 6,299,403 B1 | | 10/2001 | Lee | 414/463 |
| 6,390,452 B1 | * | 5/2002 | Dobmeier et al. | 254/323 |
| 6,409,454 B1 | * | 6/2002 | Yamamoto | 414/463 |
| 6,427,981 B1 | * | 8/2002 | Kingsbury et al. | 254/323 |
| 6,435,479 B1 | * | 8/2002 | Raz et al. | 254/323 |
| 6,499,724 B1 | * | 12/2002 | Dobmeier et al. | 254/323 |
| 2002/0149008 A1 | | 10/2002 | Dziedzic | 254/323 |

* cited by examiner

Primary Examiner—Janice L. Krizek
(74) Attorney, Agent, or Firm—Davidson, Davidson & Kappel, LLC

(57) ABSTRACT

A support mechanism for use in releasably stowing a load on a vehicle. The support mechanism includes a flexible member extending from the vehicle, and an annular fitting member having a receiving end for receiving the flexible member. An inside surface of the fitting member is tapered at the receiving end so that an inside diameter of the fitting member decreases with distance from the receiving end. In addition, a method for selectively moving a load on a vehicle from a stowed position to a released position using a supporting mechanism including a flexible member extending from the vehicle. The method includes providing an annular fitting member for receiving the flexible member, supporting the load using the fitting member, and moving the fitting member further away from the vehicle so as to bring the load into the released position.

16 Claims, 1 Drawing Sheet

SPARE TIRE CARRIER

FIELD OF THE INVENTION

The present invention relates generally to a carrying device for a vehicle and more particularly to a spare tire carrier.

BACKGROUND OF THE INVENTION

Vehicles with inflatable tires are conventionally equipped with spare tires. Some spare tires are stored under the vehicle using a tire carrier which includes a winch for raising and lowering the spare tire between a stowed and a released position. The winch generally raises and lowers the spare tire using a flexible member such as a cable or cord that is wound and unwound around a spool or wheel.

For example, U.S. patent application Ser. No. 09/834,666, published on Oct. 17, 2002 as Pub. No. U.S. 2002/0149008, and issued on Mar. 4, 2003 as U.S. Pat. No. 6,527,252, which is incorporated by reference herein, describes an underbody spare tire storage assembly having a support member including a base, a primary support mechanism, a secondary support mechanism including a cylindrical fitting member, and a release member. The primary support member includes a flexible member in the form of a multi-strand steel cable that may be wound around a rotating drum. One end of the multi-strand steel cable is crimped to the cylindrical fitting member of the support mechanism. This crimped end, in turn, supports the spare tire (the end of the fitting member at which the cable enters the fitting is referred to here as the receiving end of the fitting member). In order to stow the spare tire, the user causes the drum to rotate, thus winding the multi-strand steel cable onto the drum and lifting the spare tire until the multi-strand steel cable is fully wound as per the design requirements. A disadvantage of these known types of spare tire storage systems lies in the connection between the multi-strand steel cable and cylindrical fitting member at the receiving end of the fitting member. Over the service lifetime, and especially when the spare tire is not in a fully tightened position, bending of the multi-strand steel cable can occur at sharp angles at or near its connection to the fitting member at the receiving end of the fitting member. In addition, abrasive surface-to-surface wear between the cable and receiving end of the fitting member can also occur. The repetition of the abrasive wear and sharp bends of the cable can cause cable failure by either fatigue or wear or tensile loading or any combination of these failure modes. This may include fraying and eventual braking of the multi-strand steel cable at the receiving end of the fitting member.

Failure of the flexible member in such a spare tire storage assembly could have the undesirable consequence of allowing the load (i.e. the spare tire) to become detached from the vehicle. For this reason, there have been many attempts to provide a secondary latch mechanism to prevent the load from becoming detached from the vehicle in the case of a failure of the flexible member. U.S. Pat. Nos. 6,267,546, 6,293,522, and 6,142,449 are examples of such safety mechanisms and generally describe support mechanisms for releasably storing a spare tire on a vehicle.

SUMMARY OF THE INVENTION

An object of the present invention is to provide a support mechanism for use in releasably storing a load on a vehicle that improves the durability of the flexible member or multi-strand steel cable of the support system. Modifying the geometry of the receiving end of the fitting member decreases wear and therefore also the failure rate of a multi-strand steel cable or other flexible member.

The present invention provides a support mechanism with improved durability performance for use in releasably stowing a load on a vehicle. The support mechanism includes a flexible member extending from the vehicle and an annular fitting member having a receiving end for receiving the flexible member. The flexible member is bendable and may include a multi-strand steel cable. An inside surface of the fitting member is tapered at the receiving end so that an inside diameter of the fitting member decreases with distance from the receiving end. The annular fitting member may also include a swivel portion to allow the load to rotate relative to the flexible member. The support mechanism may include a secondary latch mechanism to as an added safety measure in case of eventual failure of the flexible member or other part of the mechanism.

The support mechanism may also include a fitting member that is crimped to the flexible member at a distance from the receiving end of the fitting member. The tapered inside surface of the fitting member may be curved in a longitudinal direction of the flexible member, i.e. a rounded taper. The taper may extend to the point at which the fitting member is crimped to the flexible member, after which point the inside diameter of the fitting member may be nearly constant as determined by the crimp. Furthermore, the fitting member may be configured to support the load, either directly, or by supporting other members that, in turn, support the load. The load may include a spare tire.

The support mechanism may also include a winding mechanism for selectively winding the flexible member, which may be a metal multi-strand steel cable. The support mechanism may move the load from a stowed to a released position. The support mechanism may also include a support member configured to be supported by the fitting member. The support member defines an aperture for receiving the multi-strand steel cable and has a convex surface in contact with a retainer member that supports the load. The convex surface may be at least partially spherical. The load may include a spare tire assembly having a hub defining a central aperture, and the retainer member may have a configuration that allows it to pass through the central aperture in a released position of the support mechanism.

In addition, the support mechanism may also include a compression member configured to provide compressive force on the fitting member in a stowed position of the support mechanism. Where the load is a spare tire, the compression member may be configured to provide a compressive force on the fitting member in a stowed position of the support mechanism when the tire is deflated. The annular fitting member may include a flange for supporting the compression member.

The invention also provides a method for selectively moving a load on a vehicle from a stowed position to a released position (or from a released position to a stowed position) using a supporting mechanism including a flexible member extending from the vehicle. The method includes providing an annular fitting member having a receiving end for receiving the flexible member, supporting the load using the fitting member, and either moving the fitting member further away from the vehicle so as to bring the load into the released position or moving the fitting member closer to the vehicle so as to bring the load into the stowed position. An inside surface of the fitting member is tapered at a region of the receiving end so that an inside diameter of the fitting member decreases with distance from the receiving end. The moving of the fitting member may be performed using a winding mechanism to unwind (or wind) the flexible member.

BRIEF DESCRIPTION OF THE DRAWINGS

The present invention is elaborated upon below with reference to the accompanying drawing, in which.

DETAILED DESCRIPTION

Figure 1:
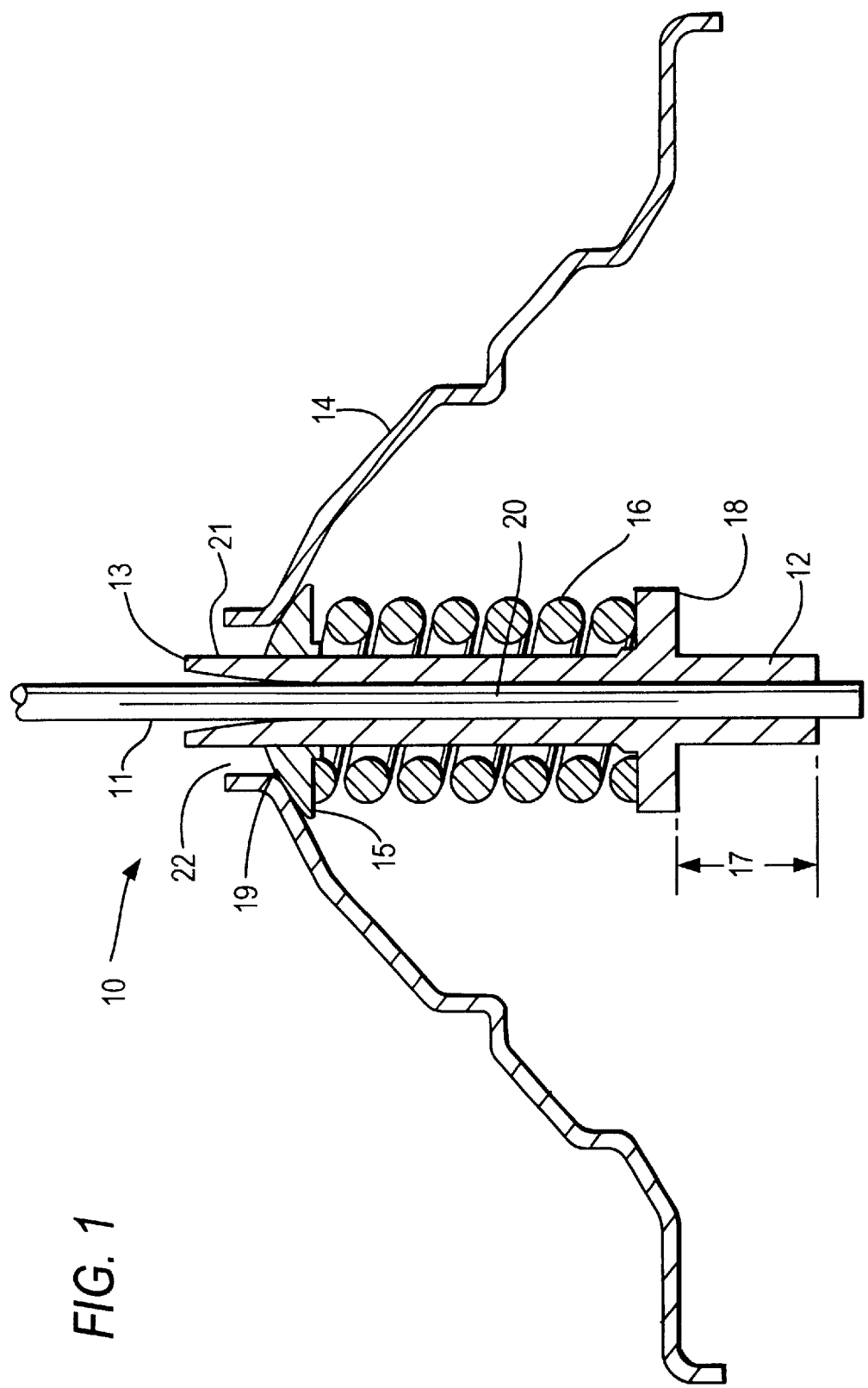
FIG. 1 shows a schematic diagram of a supporting mechanism according to the present invention.

Spare tire storage assembly 10, shown in FIG. 1 in a stowed position, includes a flexible member shown here as multi-strand steel cable 11. Flexible member (i.e. multi-strand steel cable) 11 extends from a winding mechanism 30 of the storage assembly at one end. Winding mechanism 30 may be driven mechanically by crank 31, or automatically, for example, using an electric motor. Spare tire storage assembly may be mounted to the underside of a vehicle. Annular fitting member 12 is adapted to receive the other end portion 20 of flexible member 11. Flexible member 11 is fixedly connected to annular fitting member 12, for example by crimping, in a region indicated by reference number 17 of fitting member. Fitting member may include a swivel portion (not shown) to allow a rotational movement between the load and flexible member 11.

Support member 15 supports spare tire hub retainer 14 (shown in cross-section in FIG. 1) in conjunction with flexible member 11, fitting member 12 and compressible member 16. Compressible member 16, may be a spring which surrounds fitting member 12 and is sandwiched longitudinally between flange 18 of fitting member 12 and support member 15. In the stowed position of the load shown in FIG. 1. compressible member 16 is compressed. Support member 15 may have convex surface 19, which is in contact with spare tire hub retainer 14. The spare tire hub retainer retains the load, (for example, a hub of a spare tire) which, in FIG. 1 is shown as spare tire assembly 25 including a spare tire hub portion 26 defining hub aperture 28 and a spare tire portion 27.

The spare tire is connected and disconnected to storage assembly 10 as follows. Spare tire hub retainer 14 has an elongated shape with a width (as measured along an axis perpendicular to the drawing in FIG. 1) and a height (as measured vertically in FIG. 1) that are each less than the inside diameter of a center aperture of the spare tire hub and a length (as measured horizontally in FIG. 1) that is greater than the inside diameter of the center aperture in the hub. When the flexible member 11 is slack, (e.g. by unwinding the winding mechanism) the elongated spare tire hub retainer 14 can be moved away from the spare tire hub and oriented with respect to the spare tire hub so that the length of the elongated retainer 14 is roughly perpendicular to the hub. In this orientation, the elongated hub retainer 14 is able to pass lengthwise unobstructed through the center aperture of the hub. The flexible member 11, fitting member 12, compression member 16 and support member 15 also fit easily through the center aperture of the spare tire hub, thus disconnecting the spare tire from storage assembly 10. The spare tire may be connected again to the storage assembly 10 in a like manner by passing flexible member 11, fitting member 12, compression member 16, support member 15, and hub retainer 14 back through the center aperture of the spare tire hub and orienting the hub retainer 14 so that the elongated shape of the hub retainer 14 prevents its passage through the center aperture of the hub and the entire weight of the spare tire can be supported by the spare tire storage assembly 10.

Once a spare tire has been placed on hub retainer 14 as described, the spare tire can be moved to a stowed position, i.e. the position shown in FIG. 1, by winding up the multi-strand steel cable. As the multi-strand steel cable becomes fully wound and the spare tire reaches the stowed position, the compressible member 16 compresses the spare tire against the vehicle to minimize jarring or unwanted tire movement and helps to maintain the spare tire in its stored orientation in the event of tire pressure loss by compensating for reduced tire thickness.

Inside surface 21 if fitting member 12 is tapered at receiving end 13 of the fitting member so that the inside diameter of the fitting member 12 decreases as the distance from receiving end 13 increases. The tapered inside surface of fitting member aids in guiding the bend of the flexible member 11, to decrease bending stress, and prevent flexible member from bending at an angle that is greater than its flexible bending range.

In prior art underbody spare tire storage systems, spare tires that have been stowed have been known to become loose with respect to the vehicle despite the presence of a compressible member like that shown in FIG. 1. When the spare tire becomes loose, it will move and bounce around relative to the vehicle and can cause abrasive wear, severe stress and sharp bending of the multi-strand steel cable or other flexible member. The multi-strand steel cable is liable to experience the most wear and severe bending in the area of the receiving end of the fitting member, which in turn can lead to cable failure. Absence of a tapered inside surface of a fitting member in these systems have allowed the multi-strand steel cable to bend at sharp angles, thus causing undue wear and fatigue on the multi-strand steel cable. The tapered inside surface of the fitting member according to the present invention helps to guide the bend of the flexible member and prevent sharp bends, and reduces the instances and severity of abrasive contact between the flexible member and the receiving end of the fitting member.

In addition to the tapered inside surface of the fitting member, the support member 15 may also help to reduce unnecessarily sharp bending of flexible member 11. Preferably, support member 15 has a convex (preferably spherical) shaped upper surface that is in contact with the spare tire hub retainer 14. This shape helps to remove stress on the multi-strand steel cable if the tire becomes loose because it tends to keep the plane of the spare tire perpendicular to the fitting member 12 and the multi-strand steel cable 11 at the point where it enters the fitting member 12. Thus, it aids in minimizing bends in the multi-strand steel cable where the multi-strand steel cable enters the fitting member. Sharp changes in the angle of the plane of the spare tire with respect to the multi-strand steel cable contribute to unduly sharp bends in the multi-strand steel cable that exceed the multi-strand steel cable's flexible bending range.

It will of course be understood that the present invention has been described above only by way of example and that modifications of details can be made within the scope of the invention.

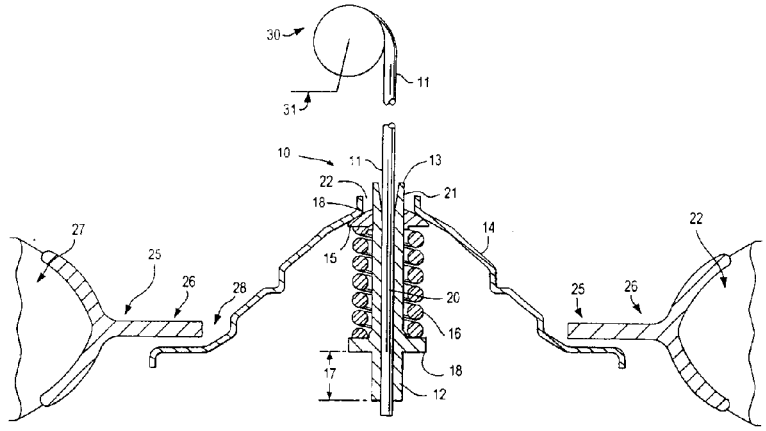

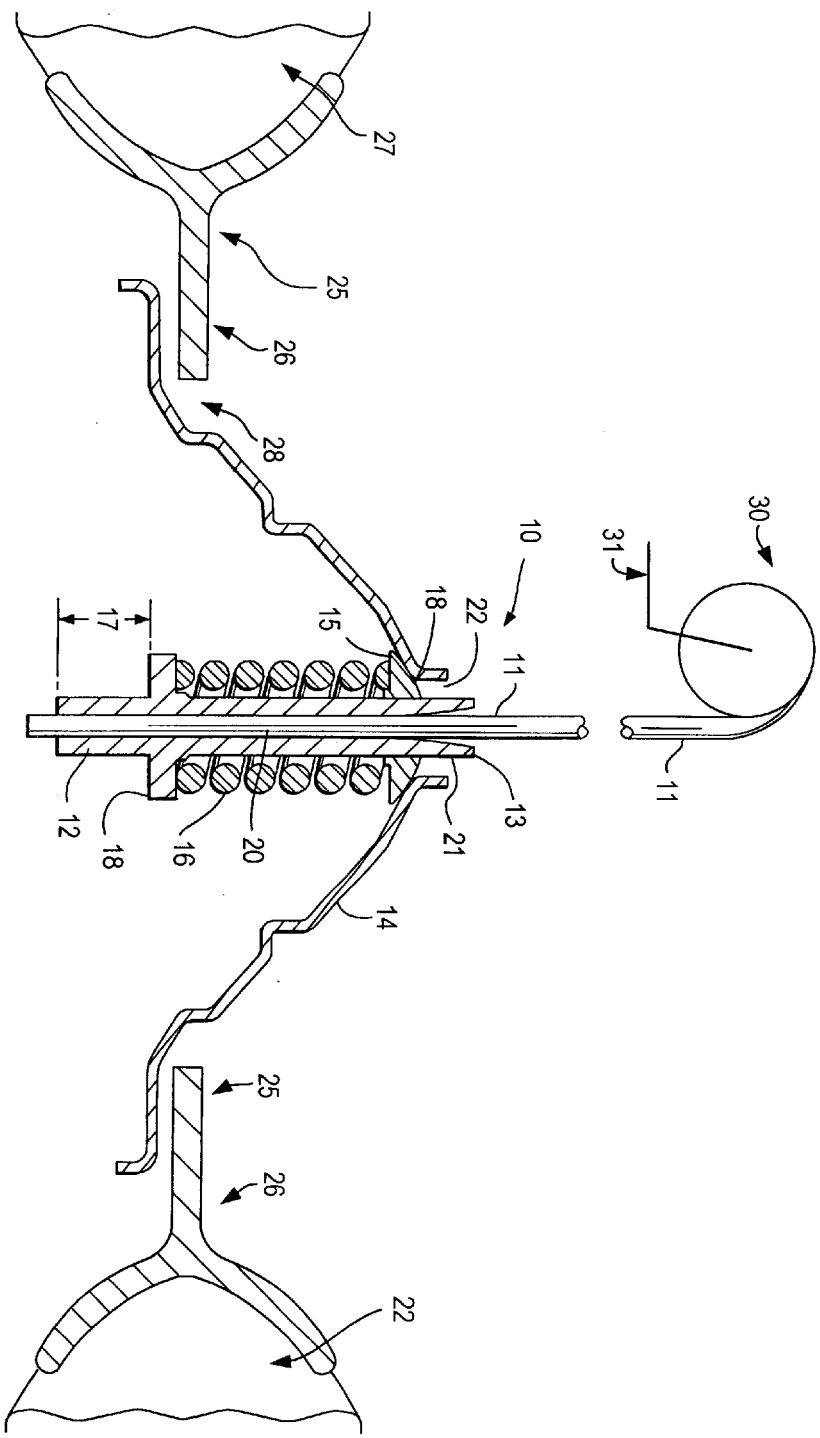

What is claimed is:

1. A support mechanism for use in releasably stowing a load on a vehicle, the support mechanism comprising:
    a flexible member extending from the vehicle; and
    an annular fitting member fixedly connected to the flexible member and having a receiving end for receiving the flexible members, wherein an inside surface of the fitting member is tapered at the receiving end so that an inside diameter of the fitting member decreases with distance from the receiving end.

2. The support mechanism as recited in claim 1 wherein the fitting member is crimped to the flexible member at a distance from the receiving end of the fitting member.

3. The support mechanism as recited in claim 1 wherein the tapered inside surface of the fitting member is curved in the longitudinal direction of the flexible member.

4. The support mechanism as recited in claim 1 wherein the fitting member is configured to support the load.

5. The support mechanism as recited in claim 1 wherein the load includes a spare tire.

6. The support mechanism as recited in claim 1 further comprising a winding mechanism for selectively winding the flexible member.

7. The support mechanism as recited in claim 1 wherein the flexible member includes a multi-strand steel cable.

8. The support mechanism as recited in claim 1 further comprising a hub retainer and wherein the receiving end is disposed between the hub retainer and the vehicle.

9. The support mechanism as recited in claim 8, further comprising a support member disposed between the fitting member and the hub retainer.

10. The support mechanism as recited in claim 1 further comprising a support member and a hub retainer, the support member configured to be supported by the fitting member, the support member defining an aperture for receiving the flexible member and having a convex surface in contact with the hub retainer.

11. The support mechanism as recited in claim 10 wherein the convex surface is at least partially spherical.

12. The support mechanism as recited in claim 10 wherein the load includes a spare tire assembly having a hub defining a central aperture, and wherein the hub retainer has a configuration that allows it to pass through the central aperture in a released position of the support mechanism.

13. The support mechanism as recited in claim 1 wherein the support mechanism moves the load from a stowed position.

14. The support mechanism as recited in claim 13 further comprising a compression member configured to provide compressive force on the fitting member in a stowed position of the support mechanism.

15. The support mechanism as recited in claim 14 wherein the load is a spare tire and the compression member is configured to provide a compressive force on the fitting member in a stowed position of the support mechanism when the spare tire is deflated.

16. The support mechanism as recited in claim 14 wherein the annular fitting member includes a flange for supporting the compression member.

* * * * *

UNITED STATES PATENT AND TRADEMARK OFFICE
CERTIFICATE OF CORRECTION

PATENT NO. : 6,682,293 B2
DATED : January 27, 2004
INVENTOR(S) : Dziedzic et al.

It is certified that error appears in the above-identified patent and that said Letters Patent is hereby corrected as shown below:

Title page,
Figure 1 is deleted an replaced with the attached Figure 1 as shown on the attached title page.

Drawings,
Replace Fig 1. with the attached.

Column 5,
Line 6, delete "flexible members" replace with -- flexible member --.

Signed and Sealed this

Twenty-fourth Day of August, 2004

JON W. DUDAS
*Director of the United States Patent and Trademark Office*

(12) United States Patent
Dziedzic et al.

(10) Patent No.: US 6,682,293 B2
(45) Date of Patent: Jan. 27, 2004

(54) SPARE TIRE CARRIER

(75) Inventors: Jerzy Dziedzic, Milford, MI (US); Nishkamraj U. Deshpande, Novi, MI (US); Mohammed Asif Movania, Farmington, MI (US)

(73) Assignee: Edscha North America, Pontiac, MI (US)

(*) Notice: Subject to any disclaimer, the term of this patent is extended or adjusted under 35 U.S.C. 154(b) by 0 days.

(21) Appl. No.: 10/071,948

(22) Filed: Feb. 7, 2002

(65) Prior Publication Data

US 2003/0147731 A1 Aug. 7, 2003

(51) Int. Cl.$^7$ .................................. B66D 1/00
(52) U.S. Cl. ........................ 414/463; 254/323
(58) Field of Search ................ 414/463, 466; 254/323

(56) References Cited

U.S. PATENT DOCUMENTS

| | | | |
|---|---|---|---|
| 3,372,821 A | * 3/1968 | Podhajsky | 414/463 |
| 3,856,167 A | 12/1974 | Yasue et al. | 214/451 |
| 4,884,785 A | 12/1989 | Denman et al. | 254/389 |
| 4,915,358 A | 4/1990 | Stallings | 254/323 |
| 5,188,341 A | 2/1993 | Greaves | 254/323 |
| 5,314,288 A | 5/1994 | Schmidt | 414/463 |
| 6,079,932 A | 6/2000 | Boucher | 414/463 |
| 6,142,449 A | 11/2000 | Aldridge et al. | 254/323 |
| 6,267,546 B1 | 7/2001 | Oxyer et al. | 414/463 |
| 6,293,522 B2 | 9/2001 | Dobmeier et al. | 254/323 |
| 6,299,403 B1 | 10/2001 | Lee | 414/463 |
| 6,390,452 B1 * | 5/2002 | Dobmeier et al. | 254/323 |
| 6,409,454 B1 * | 6/2002 | Yamamoto | 414/463 |
| 6,427,981 B1 * | 8/2002 | Kingsbury et al. | 254/323 |
| 6,435,479 B1 * | 8/2002 | Raz et al. | 254/323 |
| 6,499,724 B1 * | 12/2002 | Dobmeier et al. | 254/323 |
| 2002/0149008 A1 | 10/2002 | Dziedzic | 254/323 |

* cited by examiner

*Primary Examiner*—Janice L. Krizek
(74) *Attorney, Agent, or Firm*—Davidson, Davidson & Kappel, LLC

(57) ABSTRACT

A support mechanism for use in releasably stowing a load on a vehicle. The support mechanism includes a flexible member extending from the vehicle, and an annular fitting member having a receiving end for receiving the flexible member. An inside surface of the fitting member is tapered at the receiving end so that an inside diameter of the fitting member decreases with distance from the receiving end. In addition, a method for selectively moving a load on a vehicle from a stowed position to a released position using a supporting mechanism including a flexible member extending from the vehicle. The method includes providing an annular fitting member for receiving the flexible member, supporting the load using the fitting member, and moving the fitting member further away from the vehicle so as to bring the load into the released position.

16 Claims, 1 Drawing Sheet